US005411799A

United States Patent [19]

Loving

[11] Patent Number: 5,411,799

[45] Date of Patent: May 2, 1995

[54] MICROTAG AND METHOD

[76] Inventor: Charles D. Loving, 426 Country Club, Stansbury Park, Utah 84074

[21] Appl. No.: 161,778

[22] Filed: Dec. 2, 1993

Related U.S. Application Data

[60] Continuation-in-part of Ser. No. 862,217, Apr. 2, 1992, abandoned, which is a continuation-in-part of Ser. No. 631,968, Dec. 21, 1990, abandoned, which is a division of Ser. No. 481,897, Feb. 20, 1990, abandoned.

[51] Int. Cl.[6] ........................ B32B 5/16; B32B 27/36; B42D 15/00

[52] U.S. Cl. .................................... 428/343; 428/192; 428/200; 428/915; 283/74; 283/81; 156/277

[58] Field of Search ........................ 428/220, 343, 480; 283/74, 81; 156/277

[56] References Cited

U.S. PATENT DOCUMENTS 4,763,928 8/1988 Krietemeier et al. ................. 283/70

*Primary Examiner*—George F. Lesmes
*Assistant Examiner*—Kathryne E. Shelborne
*Attorney, Agent, or Firm*—J. Winslow Young

[57] ABSTRACT

A microtag cut from a sheet of plastic material and having at least one acuminate snag extending outwardly from the microtag. The sheet of plastic material includes a serial number replicated a plurality of times and the microtag is cut so as to contain at least one complete serial number. Each microtag is less than about two millimeters in diameter. The plastic material is nonconductive and can be from a plastic that will fluoresce under certain wavelengths of light. A plurality of microtags can be used to mark an item of personal property.

6 Claims, 1 Drawing Sheet

MICROTAG AND METHOD

RELATED APPLICATIONS

This application is a continuation-in-part application of my application Ser. No. 07/862,217 filed 2 Apr. 1992 for IDENTIFICATION SYSTEM AND METHOD (now abandoned) which was a continuation-in-part application of application Ser. No. 07/631,968 filed 21 Dec. 1990 for IDENTIFICATION APPARATUS AND METHOD (now abandoned) which was a divisional application of Ser. No. 07/481,897 filed 20 Feb. 1990 for IDENTIFICATION APPARATUS AND METHOD (now abandoned).

BACKGROUND

1. Field of the Invention

This invention relates to microtags and, more particularly, to a novel microtag and method, the microtag having at least one acuminate snag extending outwardly from the periphery and a preselected indicia on a face for purpose of marking or otherwise tagging an item of personal property wherein each item of personal property is tagged with one or more microtags that are releasably engaged to the item of personal property by the acuminate snag.

2. The Prior Art

The proper identification of personal property is important particularly to prove ownership in the event of inadvertent misplacement or loss through unlawful activity such as theft. The subsequent, proper recovery of the item of personal property requires accurate identification of the property to assure that the correct owner of the property receives the correct item of personal property. This problem is significant even where the particular item of person property is visibly marked with a serial number or such other device since owners rarely properly record serial numbers of person property.

The foregoing problem is compounded by the unlawful interference with ownership of personal property through theft and the like. In particular, it is a common practice by persons belonging to the criminal element in society to remove serial number plates and decals and even replace them with counterfeit or even legitimate serial numbers taken from other articles of equipment. The primary purpose of this activity is to enable the perpetrator to sell or otherwise exchange the item for money or other items of value to the perpetrator. The altered serial number conceals the origin and ownership of the property thereby enabling the perpetrator to more readily dispose of the property for a greater amount of value.

While the use of a Serial number decal is of limited value for indicating ownership, another method for marking an item of personal property involves physically marking the serial number on the item with an indelible ink or by engraving the serial number on the item. Each of the foregoing techniques for property identification can be circumvented, for example, by the simple removal of the serial number or replacement of the serial number decal with another decal. The ease by which these marking systems are circumvented has created a significant problem in personal property recovery.

Another problem with the foregoing techniques for property identification is that the certain tag systems are inappropriate in that they may interfere with the function or even aesthetic appearance of the item. For example, an item of jewelry such as a valuable gem stone mounted in a ring setting is difficult, if not impossible, to mark with an identification system that cannot be easily circumvented.

One specific identification system designed for identifying the source of a particular explosive product involves the use of color-coded microspheres which are blended into the explosive composition. The color-coded microspheres are blended into the explosive during manufacture so as to enable the appropriate police agencies to identify the specific batch that was the source of the particular explosive which created the event which is under investigation. In this case, the number of color-codings available to the manufacture are fairly limited. Further, it would be desirable to mark each item, even every stick of dynamite, with its own specific identity that would not be destroyed by the detonation process.

The patent of Dillon (U.S. Pat. No. 4,143,734) discloses an identification system wherein a plurality of microdots are produced by photoreduction techniques. In particular, the method consists essentially of printing the indicia in multiple units on a large plate with the images being reduced in size by step photographic process. The result is a glass slide having the negative of the image developed thereon. The image is then transferred photographically to a piece of film of the same size as the glass slide. The film is then cut into the individual microdots. The microdots are immersed in a carrier fluid which is used as the vehicle to apply the microdots to the item to be marked.

The reference of Krietemeier et al (U.S. Pat. No. 4,763,928) teaches the identification of articles using a miniature disc cut from a thin film bearing preassigned data. The film is produced as a strip with the individual discs partially severed from the film to enable the user to retrieve individual discs and place them at discrete locations on the articles.

An optically coded identification system for marking an item of personal property is disclosed in the patent of Richardson (U.S. Pat. No. 4,239,261). The labels are formed from a thin microsized plate of generally transparent material having the marking indicia thereon. The indicia is optically coded with a digital bit of data.

A document identification system for authenticating a document is disclosed in the patent of Knop (U.S. Pat. No. 4,661,983) as a random-pattern of microscopic lines that inherently forms in a dielectric coating layer of a three-layer diffractive subtractive filter. An authenticating device permits identification of a genuine document by comparing read-out-line-position information derived by microscopic inspection with read-out digital codes of line information obtained earlier at the time of fabrication of the document.

However, in addition to being able to accurately identify the correct ownership of an item of personal property, there is a critical need to deter theft in the first place. A primary reason property is stolen is that it can be converted into cash or other valuables by use of an intermediary commonly referred to as a "fence." As long as the fence feels that he is sufficiently removed from the actual scene of the crime and the stolen goods, per se, are capable of being rapidly moved to an ultimate buyer without traceability to the fence, the theft of personal property will continue to be a major plague of society.

In view of the foregoing, it would be an advancement in the art to provide a novel microtag for use as an identification system whereby an item of personal property is marked with an identification system that is extremely difficult to circumvent. It would also be a significant advancement in the art to provide a novel microtag and method whereby the microtag includes acuminate snags formed at its periphery to enable the microtag to releasably cling to the item of personal property. Another advancement in the art would be to provide a microtag for use as an identification system that is specifically designed to leave a trail of microtags wherever the item of personal property is moved thereby providing an easily provable trail of evidence thereby significantly discouraging the fencing of stolen property. Such a novel apparatus and method is disclosed and claimed herein.

BRIEF SUMMARY AND OBJECTS OF THE INVENTION

This invention is a novel microtag and method for producing a disc-like microtag with at least one acuminate snag extending from the periphery of the microtag. A plurality of microtags are produced as a series with each microtag having a common indicia. The microtag is smaller than about one or two millimeters in diameter so as to accommodate a plurality of microtags being discretely placed in crevices, holes, or at other unobtrusive places on the item. The acuminate snags are formed about the periphery of each microtag and are specifically intended to releasably secure the microtag to the item being tagged. The process of cutting the microtags creates the acuminate snags which act as hook-like burrs to assist in causing the microtag to releasably cling to the item of personal property. In addition to releasably clinging to the item of personal property, a discrete number of microtags will also fall off the item of personal property thereby providing a trail of evidence as to its movements. The indicia is readable under magnification to reveal the particular identification number for the microtag.

It is, therefore, a primary object of this invention to provide improvements in microtags.

Another object of this invention is to provide improvements in the method of fabricating a microtag with one or more acuminate snags extending outwardly from its periphery.

Another object of this invention is to provide a microtag having at least one acuminate snag formed into a hook to assist in enabling the microtag to releasably cling to the surface upon which the microtag is placed.

These and other objects and features of the present invention will become more readily apparent from the following description in which preferred and other embodiments of the invention have been set forth in conjunction with the accompanying drawing and appended claims.

DETAILED DESCRIPTION OF THE PREFERRED EMBODIMENTS

Figure 1:
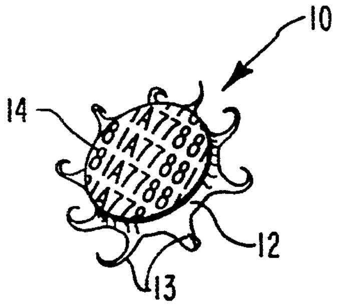
FIG. 1 is a schematic, perspective illustration of a microtag of this invention shown greatly enlarged for ease of illustration.

The invention is best understood by reference to the drawing wherein like parts are designated by like numerals throughout in conjunction with the following description.

General Discussion

Identification tags, per se, are well known for numerous items as a means for identifying the proper ownership of the item. Possibly the most widely known system for identification is the automobile license plate. Unfortunately, automobile theft is accompanied by replacement of the license plate with a license plate obtained from another source. This practice is possible because, at most, only two, fairly large size license plates are affixed to each automobile.

However, if one were to think in terms of hundreds of microscopic "license plates" concealed at numerous locations in and on the item, it becomes readily apparent that the removal of all these "license plates" is virtually impossible. Clearly, a few are easily removed, but in the absence of a complete disassembly and thorough cleaning of each disassembled part prior to reassembly, it is nearly impossible to remove all the "license plates" from the article.

Almost without exception, any item of personal property including camera equipment; electronic devices such as stereos, television sets, microwave ovens, personal computers, and video cameras; furniture; clothing; boats; automobiles; bicycles, to name a few, have folds, clefts, or concealed areas where minute microtags could be placed. For example, a camera has both external and internal clefts where one could releasably mount a set of microtags without interfering with either the operation or the aesthetic appearance of the camera. The microtags could even be placed in the seams of clothing where they would resist removal during normal cleaning operations.

In addition to the accurate identification of an item of personal property, the ability to trace its movements will contribute a significant advancement in deterring the criminal activity of a fence. This is possible since each item tagged according to this invention is tagged with a sufficient number of microtags and in such a manner that a discrete number of microtags will be dislodged from the item each time it is moved. Accordingly, the presence of a dislodged microtag should be sufficient evidence to implicate a thief or a fence even though the item itself has been sold to third parties.

The microtags of this invention are cut from a sheet of elastomeric substrate in such a manner as to produce one or more acuminate snags at the periphery of the microtag. These acuminate snags are formed as the result of a deliberately inaccurate cutting of the elastomeric substrate. Specifically, the cutting die is fabricated sufficiently out of tolerance to cause a portion of the elastomeric substrate to be torn or otherwise stretched to the breaking point to produce the horn-like protuberances which are identified herein as acuminate snags, the adjective acuminate being defined as tapering to a slender point. This slender point is created as the elastomeric material is stretched beyond its breaking point resulting in the formation of these acuminate snags as the stretched elastomeric material reaches its breaking point. The term "snag" is used in preference to "horn," "finger," "protuberance," "fray" or "sliver" in order to more accurately portray these hook-like devices particularly since they are nonuniform and yet terminate in a slender point as a result of being deformed through being stretched beyond the elastic limit of the plastic. Advantageously, some of the acuminate snags will have a hook-like curvature created in the tip as the result of the relaxation response of the elastomeric material after the stretched segment breaks when the acuminate snag is formed. This is advantageous in that it more readily enables the acuminate snag to releasably engage the surface of the item upon which the microtag has been placed.

Detailed Description

Referring now more particularly to FIG. 1, the novel microtag of this invention is shown generally at 10 and includes a substrate 12 upon which a specific serial number 14 is printed. In this case, serial number 14 is 77881A which is a combination of numerals and letters. Clearly, an almost unlimited number of individual serial numbers including symbols and the like can be used in the practice of this invention.

Substrate 12 is an elastomeric material and can be selected from any suitable, commercially available plastic material including a plastic having the ability to fluoresce when exposed to certain wavelengths of light. This feature more readily enables law enforcement personnel (not shown) to locate microtag 10, particularly when microtag 10 has been dislodged and is embedded in the clothing, etc., of a suspected criminal.

Microtag 10 includes at least one and, preferably, a plurality of acuminate snags 13 formed around its periphery. As discussed hereinbefore, acuminate snags 13 are formed by the deformational cutting of substrate 12. In particular, one can think in terms of cutting a piece of soft taffy with a knife and the stretching of a portion of the taffy between the resultant two pieces until the stretched portion ultimately breaks. What has been formed is an acuminate snag of nonuniform shape and dimensions but with a tapered, slender point at the place of separation. Acuminate snag 13 can also form a hook-like curvature as a result of the relaxation response of the plastic after breakage of the stretched plastic.

Figure 2:
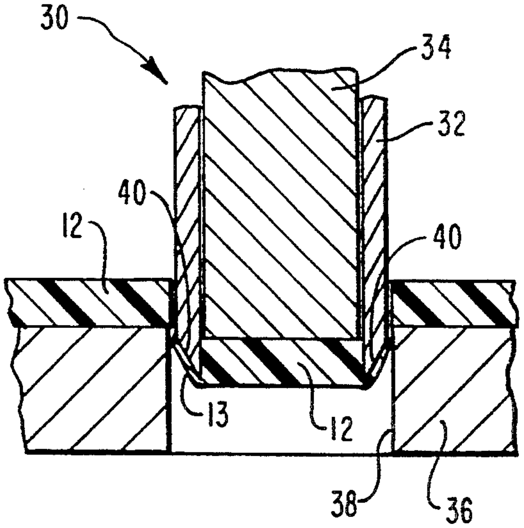
FIG. 2 is an enlarged, schematic, cross-sectional view of the fabrication process for producing the microtag of FIG. 1 with acuminate snags extending from its periphery.

This feature is illustrated in FIG. 2 wherein the cutting mechanism for cutting microtag 10 is shown generally at 30 and includes a cylindrical cutter 32, an axial stylet 34, and a die plate 36 having a die 38 formed therein. A beveled cutting edge 40 is formed around the leading edge of cylindrical cutter 32. Beveled cutting edge 40 cooperates with die 38 to punch a circular disc of substrate 12 from a larger sheet of substrate 12 supported on die plate 36. Specifically, beveled cutting edge 40 cooperates with die 38 to distortionally cut substrate 12 to produce acuminate snags 13 from the material of substrate 12 as a result of its being stretched and torn therebetween. This is contrary to all known cutting techniques because, historically, all cutting machinery is specifically designed and the tolerances are set to produce a clean cut of substrate 12 and, therefore, to specifically assure the absence of acuminate snags 13.

However, I have found that by selectively controlling the tolerance between cylindrical cutter 32 and die 38 as well as the face of beveled cutting edge 40 I can selectively produce one or more acuminate snags 13 on the periphery of microtag 10. Advantageously and surprisingly, I have found that the foregoing cutting process produces a plurality of burrs or streamer-like members shown herein as acuminate snags 13 around the periphery of microtag 10. Acuminate snags 13 are either the result of the shearing action of substrate 12 or, possibly, from a limited degree of partial melting of the plastic of substrate 12 as the shearing action occurs. In any event, I have discovered that microtag 10 will have at least one or more acuminate snags 13 extending outwardly from the periphery of substrate 12. Acuminate snags 13 are usually tapered toward the distal end and even a few may be somewhat curled or hooked due to the nature of their creation during the partial melting, stretching and breaking, followed by the subsequent cooling of the plastic below its melting temperature.

Serial number 14 is printed on substrate 12 using conventional microfilm technology to photographically reduce a set of serial numbers 14 so that a relatively small sheet of substrate 12 can contain thousands of serial number 14. This technology is known in the industry as microdot technology whereby the text from a standard, letter-size sheet of paper ($8\frac{1}{2}$ inches$\times$11 inches) can be reduced even to the size of the printed period at the end of this sentence.

In the practice of this invention, microtag 10 is cut to a size less than about 2 millimeters across and can even be substantially smaller than that. The only practical limitation to the size of microtag 10 is in the physical limitations of cylindrical cutter 32 and die 38 used to cut substrate 12 into microtag 10. Clearly, using microdot technology, there is no danger of obliterating serial number 14 regardless of the small size imparted to microtag 10.

Figure 3:
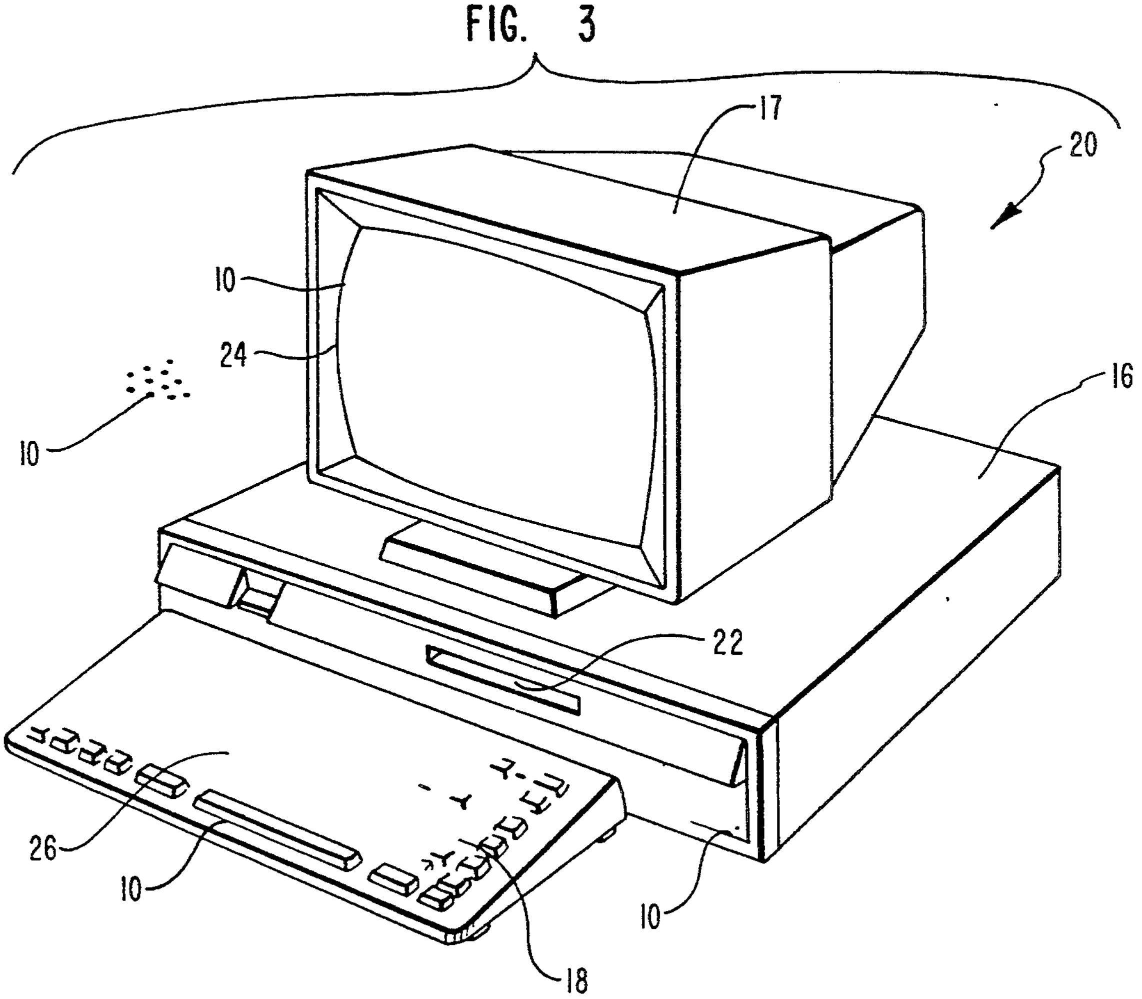
FIG. 3 is schematic illustration of a plurality of microtags shown in the environment of an item of personal property to demonstrate the novel microtag of this invention.

Microtag 10 is only one of a plurality of microtags 10 that are provided in bulk quantities containing several thousands of microtag 10 as illustrated schematically in FIG. 3. Referring further to FIG. 3, an item of personal property is shown schematically herein as a personal computer 20 consisting of a disc drive 16, a monitor 17, and a key board 18. All of these items contain various clefts or cracks into which a microtag 10 can be releasably secured. For example, disc drive 16 includes floppy slots 22, while monitor 17 has a cleft next to its screen 24, and key board 18 has a plurality of keys 26 (only a few of which are shown for ease of illustration) into which a microtag 10 can be inserted. Additionally, substrate 12 (FIGS. 1 and 2) is fabricated from a non-conducting plastic material so that microtag 10 can be mounted inside any electronic equipment without being responsible for the danger of an electrical short circuit.

Acuminate snag 13 is particularly advantageous in that it assists in providing a means of securement for microtag 10, particularly on items that include a surface into which acuminate snag 13 can become removably entangled. Clothing, carpet, and the like, are examples of such surfaces. For example, supposing computer 20 has been stolen and sold to a fence, microtag 10 will be dislodged therefrom during its transit from place to place. A plurality of microtag 10 will thereby be deposited on the clothing, carpets, upholstery, etc., throughout the automobile, residence, business, etc., of all persons associated with the theft of computer 20. The optional fluorescence of microtag 10 will aid in its being found while acuminate snag 13 will enhance the retention of microtag 10 on such fabric-like surfaces for subsequent recovery by law enforcement personnel.

The Method

The method of this invention includes selecting a sheet of substrate 12 having a plurality of serial number 14 imprinted thereon as a replication of serial number 14. Cylindrical cutter 36 is then used in conjunction with die 38 to cut microtag 10 as a circular disc from the body of substrate 12. Importantly, the diameter of the resulting microtag 10 is coordinated with the font and size of serial number 14 to assure that at least one complete set of serial number 14 is presented on the surface of microtag 10.

Further, the dimensional tolerance between cylindrical cutter 32 and die 38 is selectively predetermined to assure the absence of a clean cut of substrate 12. This feature, surprisingly, runs counter to the entire art of cutting in that it is specifically designed to be somewhat sloppy in order to achieve the production of acuminate snags 13 on the periphery of microtag 10. Once cylindrical cutter 32 has punched microtag 10 from substrate 12, stylet 34 is extended downwardly through cylindrical cutter 32 to eject microtag 10 therefrom. Upon ejection, microtag 10 is complete having serial number 14 thereon and including at least one acuminate snag 13. The importance of the presence of acuminate snag 13 can not be under emphasized since it enables microtag 10 to releasably cling at various locations, particularly in the absence of adhesives, or the like.

The method of this invention also includes preparing a plurality of microtags 10 to mark one or more items of personal property, only one of which is shown in this instance as a personal computer 20. Personal computer 20 is tagged by dispensing a plurality of microtag 10 throughout. For example, microtag 10 can be selectively dispensed in the crevices or openings around keys 26 on keyboard 18, floppy disc opening 22, around screen 24, on terminal 17, and in other cracks or crevices on hard drive 16. Further, microtag 10 can be placed at numerous locations inside each of the items at the discretion of the operator (not shown). This is particularly advantageous since substrate 12 is a nonconducting plastic.

If desired, microtag 10 can be adhesively mounted at selected locations 22, 24, and 26 by the application of an adhesive so as to more securely mount microtag 10 to personal computer 20. Clearly, any suitable adhesive may be used for this procedure.

Acuminate snags 13 also enhance the ability of microtag 10 to cling to personal computer 20, with or without the presence of adhesive. Further, acuminate snags 13 are particularly useful in releasably securing microtag 10 to the carpet, upholstered furniture, vehicle interiors, and even clothing (none shown) of the person or persons handling computer 20 as a result of its having been stolen by such person or persons. Retrieval of microtag 10 is facilitated by the fact that at least a few of microtag 10 can be made to fluoresce under the influence of a particular wavelength of light if substrate 12 is selected from a suitable material.

The use of a plurality of microtag 10, say, several thousand, each of which has an identical serial number 14 thereon means that a plurality of items of personal property such as personal computer 20 can be tagged using the novel identification system and method of this invention. Further, serial number 14 will be individualized and recorded in a central registry so that it is possible to identify the origin and possible route of passage of personal computer 20 wherever it may eventually be found.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by U.S. Letters Patent is:

1. A microtag comprising:

a body fabricated from a sheet of elastomeric material, said body having an upper surface, a lower surface and an external periphery;

at least one complete serial number on said upper surface;

a plurality of acuminate snags extending outwardly from said periphery of said body; and a hook-like projection on the end of at least one of said acuminate snags.

2. The microtag defined in claim 1 wherein said microtag is fabricated from an elastomeric material that is nonconductive.

3. The microtag defined in claim 2 wherein said elastomeric material is selected from a plastic capable of fluorescing under preselected wavelengths of light.

4. The microtag defined in claim 1 wherein said microtag comprises a first plurality of said microtags comprising adhesive means for selectively adhering said first plurality of said microtags to an item of personal property and a second plurality of said microtags is characterized by the absence of said adhesive means to provide for the dislodgement from said item of personal property of a third plurality of said microtags from said second plurality of said microtags, said third plurality of said microtags providing identification of the location of said dislodgement.

5. The microtag defined in claim 4 wherein said acuminate snag on said microtag provides clinging means for releasably clinging said microtag to said item of personal property.

6. The microtag defined in claim 5 wherein said hook-like projection serves as said clinging means.

* * * * *